United States Patent [19]

Kaplan

[11] Patent Number: 5,237,157
[45] Date of Patent: Aug. 17, 1993

[54] KIOSK APPARATUS AND METHOD FOR POINT OF PREVIEW AND FOR COMPILATION OF MARKET DATA

[75] Inventor: Joshua D. Kaplan, San Francisco, Calif.

[73] Assignee: Intouch Group, Inc., San Francisco, Calif.

[21] Appl. No.: 957,444

[22] Filed: Oct. 6, 1992

Related U.S. Application Data

[63] Continuation of Ser. No. 582,253, Sep. 13, 1990, abandoned.

[51] Int. Cl.$^5$ ............................................. G06F 15/21
[52] U.S. Cl. .................................. 235/375; 235/380; 364/401
[58] Field of Search ................... 369/33, 34; 235/375, 235/380, 381, 382, 383, 385, 462; 358/335; 364/401, 402, 403, 410

[56] References Cited

U.S. PATENT DOCUMENTS

| | | | |
|---|---|---|---|
| 3,718,906 | 2/1973 | Lightner | 235/381 |
| 3,990,710 | 11/1976 | Hughes | 369/34 |
| 4,359,631 | 11/1982 | Lockwood et al. | 235/381 |
| 4,414,467 | 11/1983 | Gould et al. | 235/381 |
| 4,528,643 | 7/1985 | Freeny, Jr. | 364/900 |
| 4,674,055 | 6/1987 | Ogaki et al. | 364/410 |
| 4,766,581 | 8/1988 | Korn et al. | 235/381 |
| 4,780,599 | 10/1988 | Baus | 235/385 |
| 4,866,661 | 9/1989 | de Prins | 235/385 |

OTHER PUBLICATIONS

Sony Auto Disc Loader CDK-006.
Digidesign Sound Tools.
TOPIX CD Premaster/Encoding System.
K. Hedlund, "CD-ROM", *Computer Reseller News* Mar. 21, 1988.
J. Rothfeder and J. Bartimo, "How Software is Making Food Sales a Piece of Cake", *Business Week* Jul. 2, 1990.
M. Bluestone, "Thanks to CDs, Listening Booths are Making a Comeback", *Business Week* May 9, 1988.
Virgin Records, Votan, Inc., Fremont, Calif.
D. Steinberg, "McKesson Data Kiosks Build Business for Its Customers", *PC Week* Mar. 3, 1988.
*Los Angeles Times*, "Automated Movie Ticket Machines Due".
Pollack, "A Credit Card Offshoot Blossoms" *New York Times* vol. 139 col. 3 pC1(N) pD1(N) Aug. 3, 1990.
Val J. Golding, *The Telephone Software Connection, Inc.* May 1980.
C. Barney, "Business Software Moves Over Phones", *Electronics* Jul. 28, 1983.
J. Beckett, "Safeway to Let Customers Do Self-Checkout", The San Francisco Chronicle.
"Introduction to Personics: New Revenues for Artists, Songwriters, Publishers, Record Companies and Retailers", The Personics System.
"Executive Summary" PICS Preview from *The Retail Network*.

*Primary Examiner*—Robert A. Weinhardt
*Attorney, Agent, or Firm*—Limbach & Limbach

[57] ABSTRACT

This invention relates to a system for user-interactive multimedia based point-of-preview. The apparatus has data storage for storage of discrete increments of information intended for subscriber selection and preview. After subscriber selection, a programmable data processor selects from storage and then transmits at least one discrete increment of information to a display means for subscriber review. Subscriber selection and profile data are collected and stored. The invention also provides for transmission of subscriber selection and subscriber profile data to a central database for collection and processing by the central processing unit. This system is used, in a particular embodiment, to preview audio programs on compact disks.

11 Claims, 3 Drawing Sheets

KIOSK APPARATUS AND METHOD FOR POINT OF PREVIEW AND FOR COMPILATION OF MARKET DATA

This is a continuation of co-pending application Ser. No. 07/582,253, now abandoned, filed on Sep. 13, 1990.

TECHNICAL FIELD

This invention relates generally to the use of CD-ROM stored audio and video data and to point of sale preview apparatus, and more particularly this invention relates to a kiosk for the playback of selected data fragments in response to a user authorization signal and to a user selection signal.

BACKGROUND OF THE INVENTION

This invention relates to a system for user-interactive multimedia based point of-preview at a remote location, particularly for use in the music industry.

The 1980s witnessed a tremendous rise in consumer demand for home entertainment products particularly for the compact disc player. Wide consumer acceptance has been the result of more affordable ownership costs, superior sonics (compared with LPs and cassettes) and remarkable ease-of-use. In the United States alone, total sales of CD players skyrocketed from 1.2 million units in 1985 to over 17 million units in 1989 (over three times the growth rate of VCRs). CD players now represent one third of all new audio component sales with projections pointing to total U.S. sales topping 30 million players in the U.S. by 1991—making the CD player the fastest growing consumer electronics product in the last twenty-five years.

Despite the explosion of CD player sales, most consumers own very few CDs (studies indicate the average CD player owner possess only nine discs). When it comes to purchasing a specific compact disc, the consumer is faced with several constraints and dilemmas. Compact discs are roughly twice the retail price ($14-$16) of LPs and cassettes and as a result, the consumer is more reluctant to explore new and/or unproven artists for fear of wasting money. Moreover, there is the issue of "selection stress", a common problem for the average music buyer who is confronted with an enormous catalogue from which to choose and few mechanisms to assist him or her in evaluating these choices. The typical retail music store has developed the "superstore" format in which to promote its products, yet salespeople generally have not kept pace with the sophistication of the market. Hence, consumers are at a clear disadvantage. They cannot sample or interact with the product while in the music store and they cannot return products they do not like. Although many consumers wish to build larger collections, buying decisions are often risky and mistakes are costly.

At the artist level, the proliferation of new music markets, styles and tastes has caused the number of record labels to increase dramatically. The record industry has expanded from several major labels in 1970 to more than 2,500 distributed and independent labels today. Each year more than 2,500 new artists are introduced into an already crowded market.

Currently, label executives have no way to test market their respective acts or albums before dollars are committed to the production, promotion and distribution process. Further there is no current methodology to build consumer awareness of the act, or to increase the act's base outside of radio and television or concert tours. Print media is heavily utilized by the retail music stores to draw attention to new and old labels and special promotions. This activity is heavily subsidized by the music label to promote their individual artist.

Each label is responsible for the recruitment, development and promotion of individual artists. The glut of records inhibits exposure at the retail level and over the airways. Some record companies have been compelled to establish marketing promotions where records are given away to promote awareness of certain acts. Because a greater investment of time, money and creativity is required to develop many of today's acts, label managers acknowledge that they are more likely than ever to cut short promotion in order to cut their losses quickly on albums that don't show early signs of returning the investment. This strongly limits the potential for success because some artists require longer and more diverse promotion.

One type of music sampling device is called PICS Previews. Although it permits some in store sampling, its use is severely limited. It primary format is based on the hardware configuration and is not easily modifiable. The device incorporates a television screen with a large keypad covered with miniature album covers, and these are locked into a laser disk player. A master disk which holds a fixed number of videoclips—usually about 80—is used as the source of music information. The consumer is permitted to view a video which represents a selection from the album. However, information from only those artists who have made a video and who are featured on the PICS can be accessed. The consumer cannot make his own selection. The selections are not necessarily those that are in the store inventory.

Another in-store device traded as Personics System provides the user with the ability to make customized tapes from selected music stored on the machines. This device is expensive to use and is time consuming. Exposure to artists is limited. The device is viewed by record production companies as cannibalistic. Record production companies have been reluctant to permit the new songs of their top artists to be presented on these devices.

Presently, the store clerk or cashier tends to utilize the in-store sound system to develop their individual musical tastes. Selection tends to be progressive, with little consumer appeal.

SUMMARY OF THE INVENTION

The present invention is directed to a user-interactive multimedia based point-of-preview system. In particular, there is provided interactive digital music sampling kiosks to the retail music industry. The listening booth of the 1950s has been reborn and through the application of software and hardware technology has been brought into the next century.

Through the kiosk station which acts as a computer age "listening booth", the consumer as a subscriber is put in contact with his purchases by having offered the ability to preview music before purchasing selections at record stores. The guesswork is taken out of music buying by offering more informed purchase decisions comparable with those available for other consumer products.

The kiosk station provides access to music products through sampling individual selections as discrete increments of information and allows the subscriber to make more educated purchases. The kiosk station will thereby dramatically change the way in which consumers purchase music. This increases buying activity and improves overall customer satisfaction. Moreover, the present invention stimulates sales gains for the record stores and provides record companies a cheaper and more effective promotional alternative which can sample consumer opinions at the point-of-sale level.

The present invention utilizes a graphical interface software, a hi-resolution touchscreen monitor, and unprecedented storage capacity. Each system can offer the consumer the ability to preview selections from up to 25,000 albums, thus allowing more informed purchasing decisions by listening to songs on an album in a mode as uninhibited as using a telephone. The customer simply takes any music selection in the store display and approaches the kiosk. After scanning their user/subscriber card (free to the user, available at the store counter) across the UPC bar code reader, the customer scans their chosen audio selection and up on the touch screen monitor appears the album cover in full color photo-graphics along with songs from the album. The user then simply touches the name of the desired song on the screen, and, through the privacy of headphones, listens to a 30 second clip of the audio program. Additional options include full motion MTV videos or Rolling Stone record reviews. The listening booth of the 1950s has been reborn and through the application of software and hardware technology, brought into the 1990s.

Because of the high level of software content, the present invention remains flexible and dynamic. The interactive touchscreen can be programmed to accommodate multiple applications running under one environment on one system. Touchscreen interface can be continually modified with additional features added over time. This encourages subscriber interest and permits a competitive advantage over competitors who have locked their design into predominately hardware configurations with little value-added software content.

The selection and input data from the subscriber is collected from each kiosk location and is transmitted to be stored in a central database for analysis by the central processing unit. Through the central processing unit, the subscriber selection and subscriber profile data can be analyzed, packaged, and distributed as information products to the entire music industry as timely and focused market research.

It is therefore an object of the present invention to provide a computer age "listening booth." Consumers will be offered the ability to preview music before purchasing selections at record stores. Preview and associated purchase data is collected and stored to provide music industry market research data.

Another object of the present invention is to take the "guesswork" out of music buying offering more informed purchase decisions comparable with those available for other consumer products. The present invention provides access to music products through sampling of individual selections and allows the consumer to make more educated purchases. This increases buying activity and improves overall customer satisfaction.

Further objects and advantages of this invention will become more apparent in light of the following drawings and description of the preferred embodiments of the invention.

DESCRIPTION OF THE PREFERRED EMBODIMENTS OF THE INVENTION

The present invention will be described here with reference to sampling and previewing audio compact discs, but those of ordinary skill in the art will recognize that other applications are possible and are intended to be within the scope of the present invention.

Figure 1:
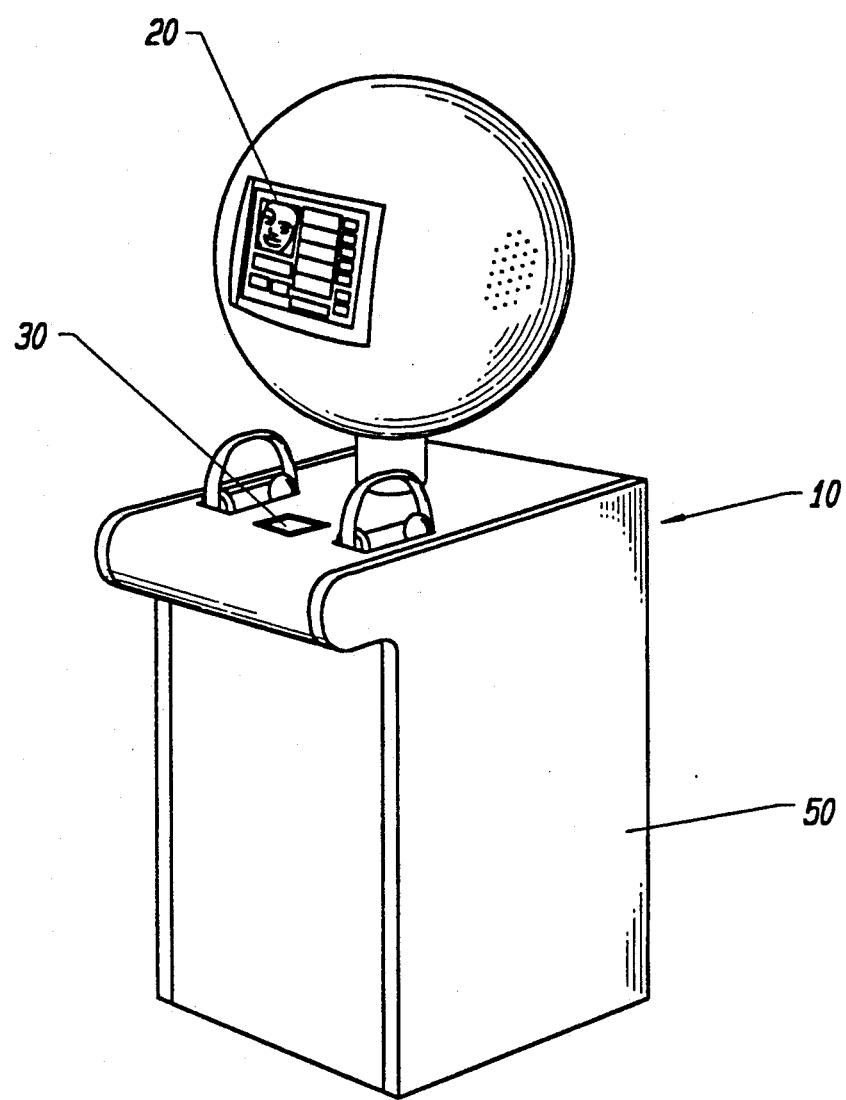
FIG. 1 is a perspective view of a typical apparatus used in the invention.

Referring to FIG. 1 of the drawings, there is a kiosk station 10 shown embodying the principles of this invention. The kiosk station 10 utilizes a custom, graphical interface (not shown), proprietary software, a hi-resolution touchscreen monitor 20, and data storage capacity. Each kiosk station 10 is provided with data compression technology which is state-of-the-art. The data compression technology is available from Fredericks and Shoe in Chicago, Illinois. The core of the kiosk station 10 is this digital compression technology, coupled with the storage and playback design. An application specific integrated circuit (ASIC) chip serves in the data compression and decoding component of the kiosk station 10. This ASIC firmware is integrated onto a custom-designed board which delivers 24 bit graphics, full motion video digital signal processing and decompression of the audio information to the subscriber. The new combination of bus technology provides for a high resolution, high quality, user friendly subscriber interface at the kiosk station 10.

On an ongoing basis music CDs are identified for addition to the kiosk station 10 storage. Once the audio samples are identified, the samples are encoded at the CD authoring station. Music CDs are digitized and encoded for storage on a CD ROM discs. The record jacket associated with each preview album is scanned and digitized. A Macintosh Sound Tool, which is a stereo direct-to-disc recording and playback system is used to process the digital signal to the CD. A Topiz CD Premaster/Encoding System or the like is used. In addition, manufacturers' UPC bar code data corresponding to the selected albums is copied and stored. The compression technology permits high capacity storage on CD ROM discs in the kiosk body 50. Each kiosk station 10 can offer the subscriber the ability to preview selections from up to 25,000 albums, thereby allowing more informed purchasing decisions by listening to songs on an album in a mode as uninhibited as using a telephone. Preview selections may be expanded or changed by changing the data on the CD ROM discs. The CD ROM discs are stored in a CD automatic disc loader. A Sony Auto Disc Loader CDK-006 can be used. This loader can house up to 60 CD ROM discs and is controlled by an external 8-bit microprocessor control system. When a subscriber scans in an album and touches selections, the disc loader will automatically scan to the appropriate slot on the disk tray. An Apple MacIntosh platform is used with a CDSC which is a CD ROM drive capable of reading data and audio disks or the like. CD ROM interface can be accomplished with a Hypercard or its equivalent. In addition, the database code will create a file for data collection each time a subscriber begins a preview session. This will identify a specific subscriber with the selections and ratings which were processed and the kiosk station 10.

To excite the subscriber, and inspire him to pick up an album from the CD rack and preview it on the kiosk station, the retail store can also be provided with a library of CD ROM discs. For example, 600 minutes of top 200 song cuts can be offered on a single CD ROM disc. These discs can be played for an entire 10 hours period without changing. The length of the CD means that there i no recurring pattern or loop. Musical selections will vary from Rock, to Jazz, to Classical, etc. with widespread appeal. This CD ROM disc sampler will contain songs from albums found on the kiosk station. In that way, a subscriber can become interested in a cut heard over the store's in-house sound system, approach the clerk and ask for the album or the artist responsible, and then proceed to pick out their selection.

To use the invention, the subscriber takes any music selection in the store display and approaches the kiosk station 10. The subscriber is provided with an access card, similar to a credit card, which is used to activate the kiosk station 10. The system interface is based on a touchscreen 20 and activated by the access card which is passed over a UPC scanner. There is no keyboard to add to levels of confusion or intimidation.

Each customer can complete a brief membership application which asks for basis demographic information, general music listening preferences and buying habits and an access card will then be generated for that subscriber. Each subscriber will have a barcode on their access card which will immediately identify them when beginning a session on the kiosk station 10. The subscriber identification can be further interfaced with the music store cash register so that with each music purchase following CD preview, the transaction will be identified as a kiosk-related sale.

A program similar to an airline frequent flyer club can be generated. The central database 60 can maintain a library of subscribers with subscriber profile information and specific preview activity. In order to incentivize subscribers to use the kiosk station 10 regularly, subscribers will earn bonus points for answering the rating questions after previewing selections at the kiosk station 10. Earned bonus points will also accumulate for kiosk-related purchases. Through a combination of rating and purchase bonus points, subscribers will become eligible for discounted and even free music sponsored by music industry participants.

Subscribers may additionally be sent quarterly statements showing a list of albums previewed and kiosk-related purchases. Listings of new releases on the kiosk stations 10, as well as various promotions sponsored by recording labels and music stores, can be disseminated to the subscribers by generation of a news letter update. Subscriber mailing lists can be used to send additional promotional material.

After scanning the access card across the barcode reader 30 which can use multiple mirrors to enhance the scan rate for a dense scan such as the MS 700 manufactured by Metrologic of Camden, New Jersey, the subscriber scans the bar code of the CD chosen, and up on the touchscreen 20 appears the album cover in full color photographs along with songs from the album. The subscriber then touches the desired song at the desired location of the touchscreen 20 and through the headphones 40 listens to a 30 second clip. Additional options include full motion MTV videos or record reviews.

The access card which is used to activate the kiosk station 10 can be used to monitor all subscriber activities and to generate, for example, demographic information and market research.

Figure 2:
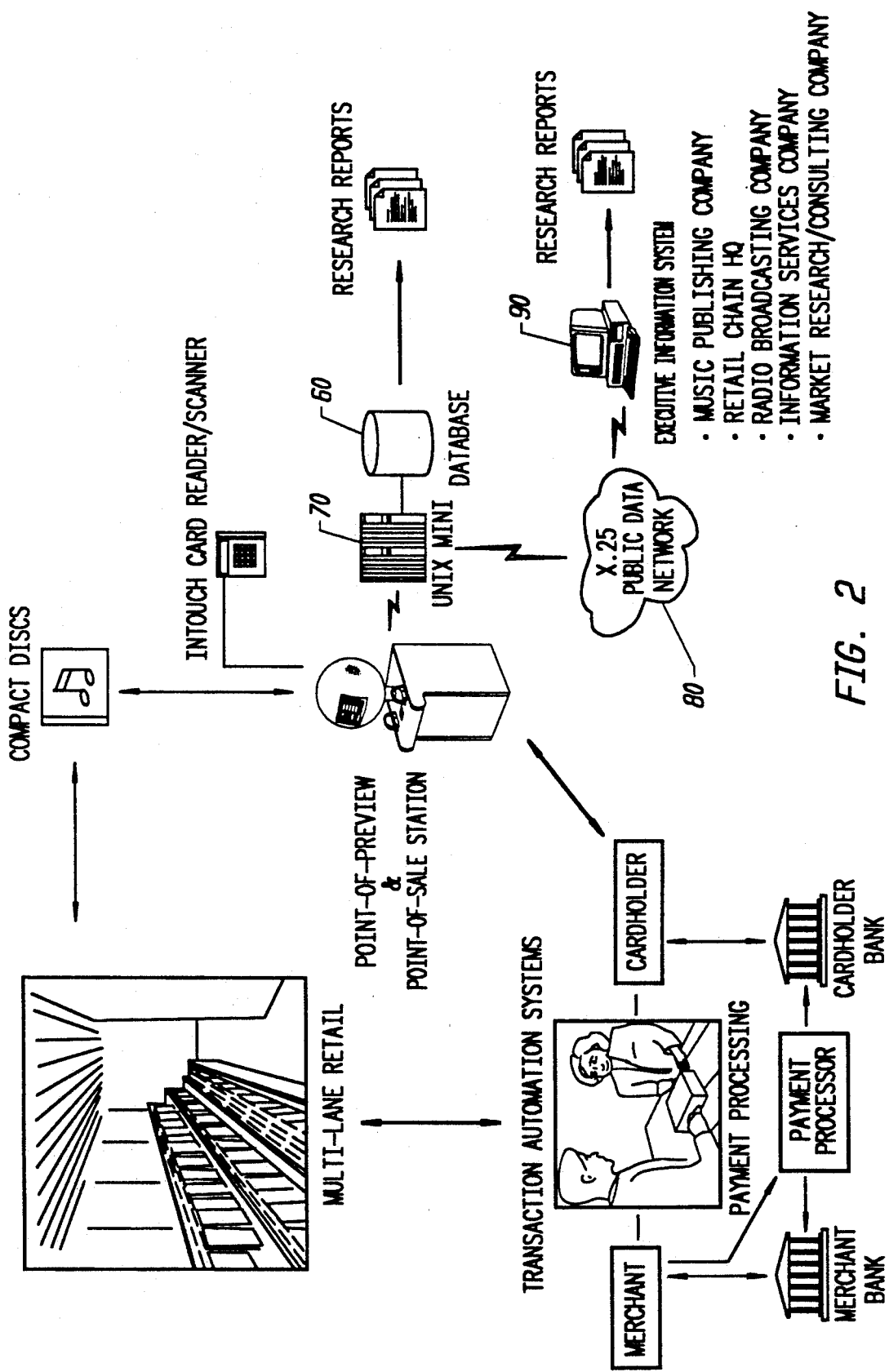
FIG. 2 is a block diagram showing the functions of devices which comprise the apparatus of the present invention.

Referring now to FIG. 2 there is shown a block diagram demonstrating the apparatus including the storage and transmission to a centralized database 60 for analysis by the central processing unit 70. Each time a subscriber activates the kiosk at the scanner 50 to begin a session, a data file is created identifying the subscriber and generating a selection preview. Additional information in the form of responses to rating questions for the selection CD and purchase indications can also be captured in the data file. The centralized database 60 can poll each kiosk station 10 at all of the remote locations through a telecommunications link. The information gathered will be analyzed and packaged into market research products for distribution in the record industry and radio stations.

FIG. 2 demonstrates that the selection choice and subscriber data can be transmitted via a public data network 80 for analysis by use of and Executive Information System (EIS) 90. Such systems provide the capabilities to analyze vast amounts of data and to convert this data into useful information on a real-time basis. EIS's allow non-programmers access to large quantities of data through an intuitive user interface. EIS's have built in tools which make modelling much easier than conventional spreadsheet or database software. The software and technical support of a major telecommunications and information network, such as Comshare, can be used. This EIS software operates in a distributed and portable environment. In addition, the EIS used will be supported on multiple platforms and operating systems. This provides for delivery of proprietary data and its analysis appropriate to the business needs of the record industry. A key attribute to most EIS systems is the provision for multidimensional data dimensions which, in the music industry, may include unit sales, time periods, geographic markets, specific music categories, configuration breakdowns, and demographic profiles of the subscriber base. The capabilities of CD ROM discs will allow for the periodic delivery of market research to the record industry on CD ROM discs.

Figure 3:
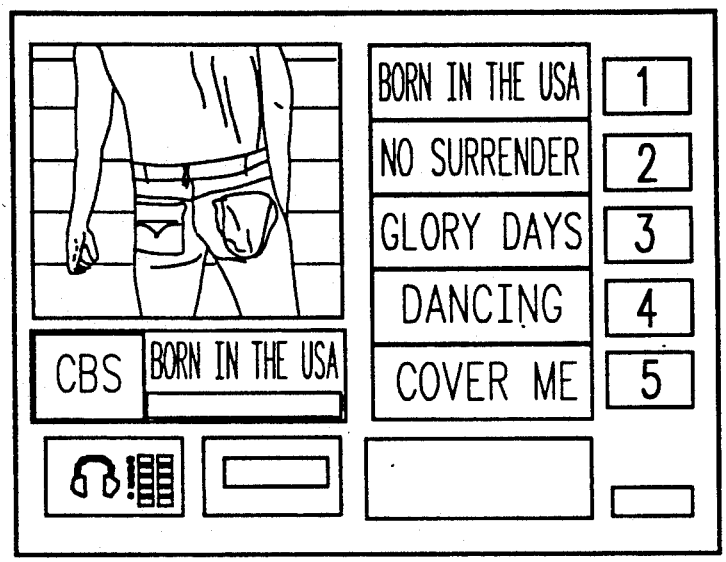
FIG. 3 is a view of a typical touchscreen software generated display interface used in the apparatus of the present invention.
Figure 4:
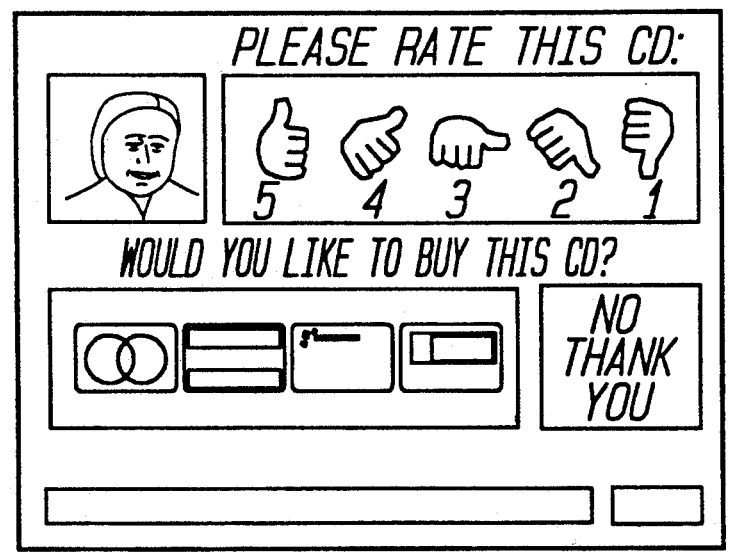
FIG. 4 is a different view of a typical touchscreen software generated display interface used in the apparatus of the present invention having further a point-of-purchase capacity.

FIGS. 3 and 4 show various software configured touchscreen display interfaces. Because the touchscreen is matrix generated by software configuration, it is flexible and dynamic. The touchscreen can be programmed to accommodate multiple applications running under one environment on one system as demonstrated in FIGS. 3 and 4. The software configuration provides for modified with additional features added over time by software modification.

Accordingly, modifications and variations to which the invention is susceptible may be practiced without departing from the scope and intent of the appended claims.

What is claimed is:

1. A method for enabling a user to preview a pre-recorded music product contained in a package, without directly accessing the information on that specific packaged pre-recorded music product available for sale by opening the packaging, using a kiosk having memory means containing prestored, audio information relating to the pre-recorded music product available for sale, the prestored information including preselected portions of the pre-recorded music product available for sale, interactive audio/video playback means including output means and user-interactive data storage processing and control means, wherein said method comprises the steps of:

a) entering a subscriber code at the kiosk user-interactive data storage processing and control means to authorize the user's access to, and use of the kiosk interactive audio-video playback means;

b) identifying a pre-recorded music product to the kiosk for user previewing by supplying a music product code from the specific music product packaging to the kiosk user-interactive data storage processing and control means; and, c) previewing prestored preselected portions of the identified pre-recorded music product by interaction of the user with the kiosk audio/video playback means and with the user-interactive data storage processing and control means to audibly preview prestored preselected portions of the music product, wherein the user interacts with the kiosk to preview prestored preselected portions of the pre-recorded music product without having to open the packaging containing the specific pre-recorded music product to be previewed by the user.

2. A method according to claim 1 wherein the kiosk has optical scanning means for reading bar code, and the subscriber code is entered at the kiosk by scanning a subscriber card marked with a bar code over the kiosk optical scanning means, the optical scanning means communicating with the user-interactive data storage processing and control means.

3. A method according to claim 1 wherein the subscriber code is entered at the kiosk by use of the interactive audio/video playback means to enter the subscriber code, the playback means communicating with the user-interactive data storage processing and control means.

4. A method according to claim 1 wherein the kiosk has optical scanning means for reading bar codes and the user identifies the pre-recorded music product for previewing to the kiosk by presenting a pre-recorded music product bearing a bar code to the kiosk optical scanning means.

5. A method according to claim 1 wherein the user identifies the pre-recorded music product for previewing to the kiosk by interacting with the interacting audio/video playback means which displays to the user the pre-recorded music products available for previewing on the kiosk.

6. A method according to claim 1 further comprising the step of:

selectively previewing preselected portions of a second music product available for sale which is related to the first pre-recorded music product identified to the kiosk in step (b) by action of the kiosk user-interactive data storage processing and control means and kiosk memory means, and by interaction of the user with the interactive audio/video playback means to audibly preview preselected portions of the second pre-recorded music product.

7. A method according to claim 1 further comprising the step of:

inputting data concerning the user's opinion of the pre-recorded music product identified to the kiosk, the data input occurring by interaction of the user with the kiosk interactive audio/video playback means.

8. A method according to claim 1 wherein step (b) precedes step (a).

9. A method according to claim 5 wherein the user identifies the pre-recorded music product for previewing by using a keyboard.

10. A method according to claim 5 wherein the user identifies an addition pre-recorded music product for previewing by using a touch screen.

11. In an apparatus for subscriber previewing of a pre-recorded music product on a kiosk having memory means containing prestored audio information relating to the pre-recorded music product available for sale, the information including preselected portions of the pre-recorded music product available for sale, interactive audio/video playback means including output means and user-interactive data storage processing and control means, wherein said apparatus in routine use involves a user entering a subscriber code to the user-interactive data storage processing and control means, identifying to the apparatus a music product to be previewed, and previewing prestored selections from the music product, a method for gathering subscriber pre-recorded product preview selection data for market research which comprises:

a) during routine use of the kiosk, storing user subscriber code information and kiosk-user pre-recorded music product identification information in the user-interactive data storage processing and control means;

b) gathering demographic information about the subscriber and correlating it with the subscriber code;

c) correlating user subscriber code information with subscriber pre-recorded music product identification information; and, d) gathering market research data by accessing the kiosk user-interactive data storage processing and control means to obtain pre-recorded music product identification information correlated with the subscriber code information, wherein demographic information about the subscriber gathered in the subscription process is used in conjunction with the accessed information to provide pre-recorded music product preview selection data for market research.

* * * * *